Patented Aug. 16, 1927.

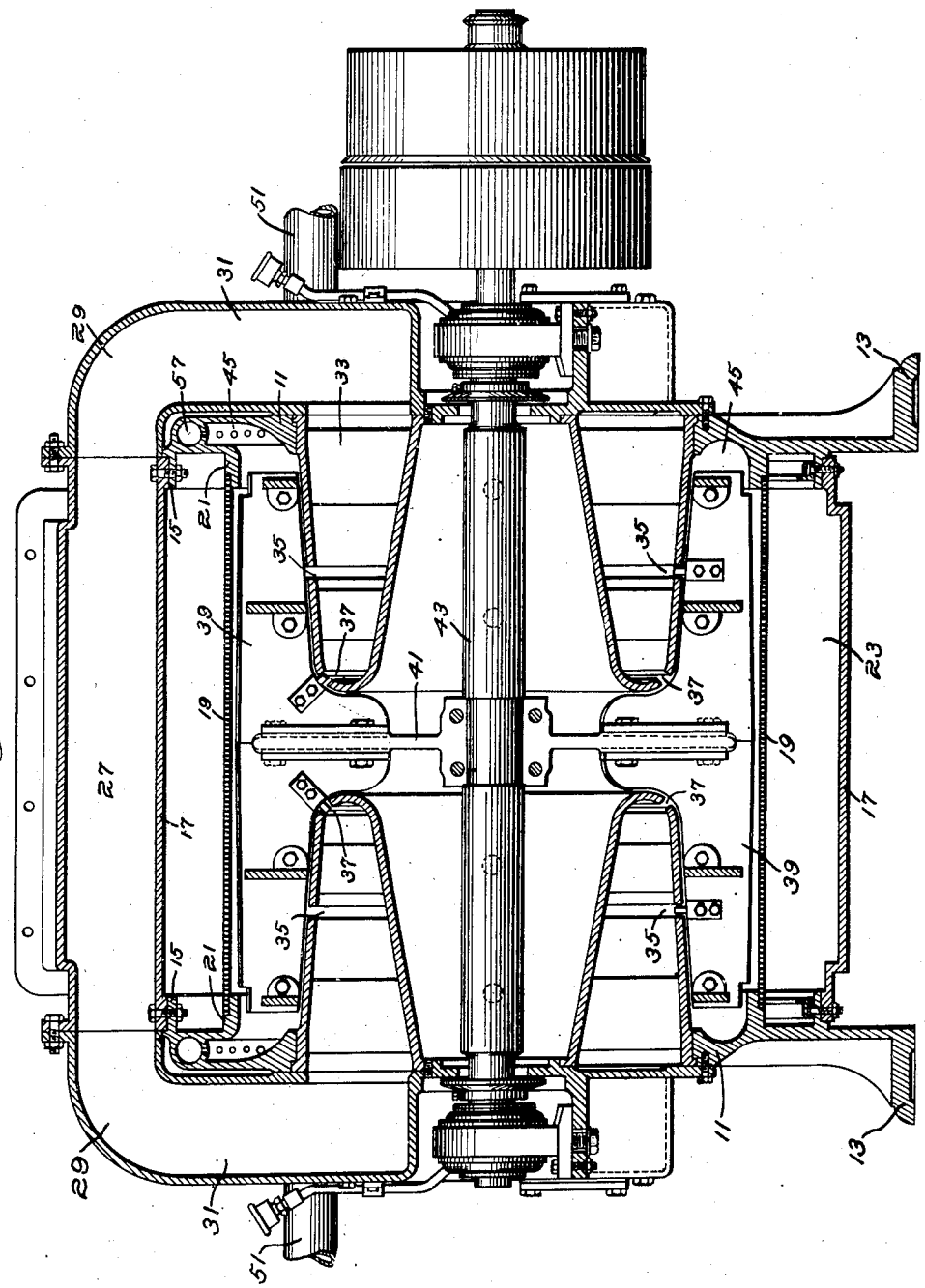

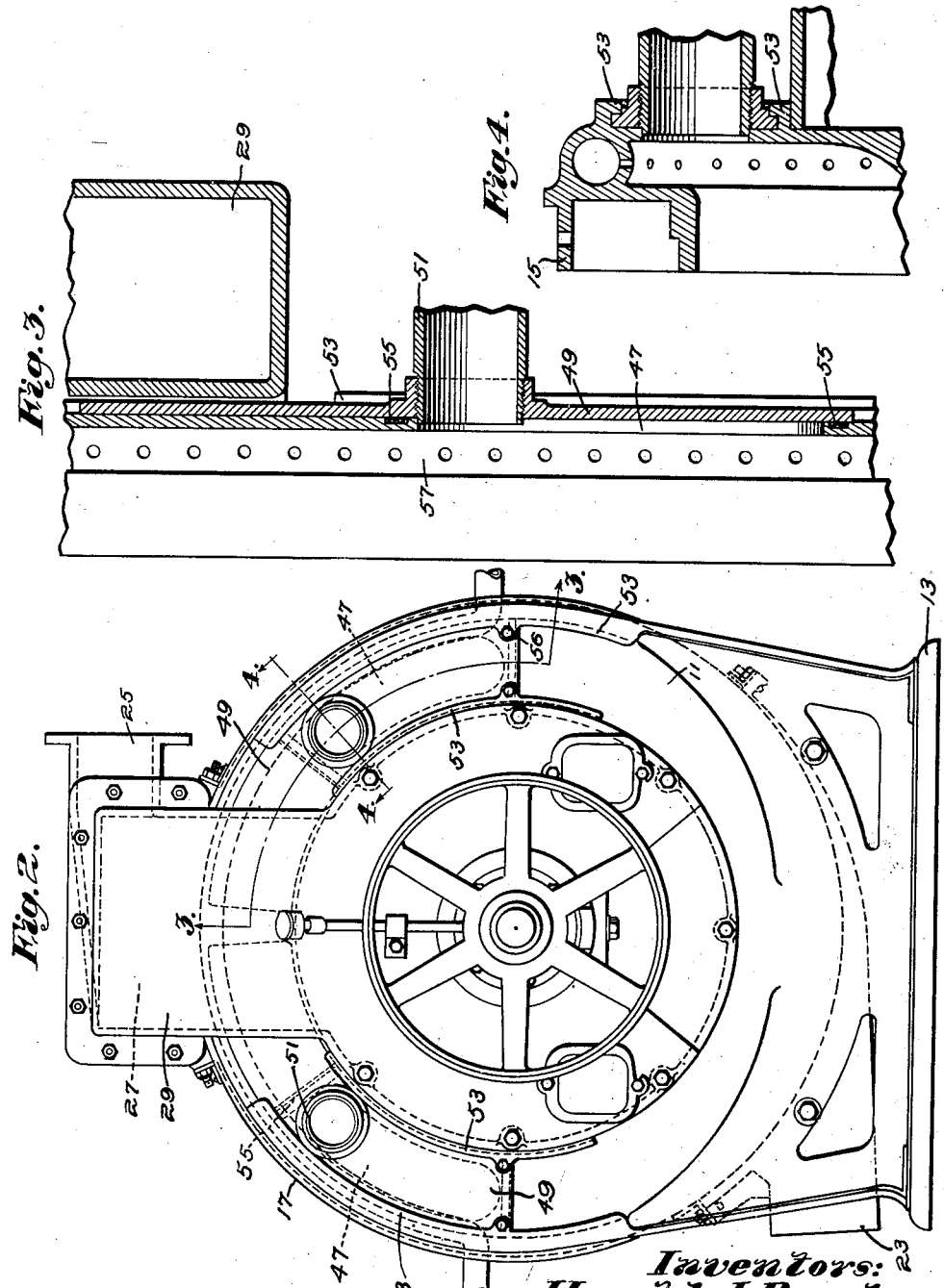

1,639,273

UNITED STATES PATENT OFFICE.

HAROLD J. REED, OF NASHUA, NEW HAMPSHIRE, AND CLAUDE L. SPAFFORD, OF SHERBROOKE, QUEBEC, CANADA, ASSIGNORS TO IMPROVED PAPER MACHINERY COMPANY, OF NASHUA, NEW HAMPSHIRE, A CORPORATION OF MAINE.

SCREEN.

Application filed April 1, 1925. Serial No. 19,890.

This invention relates to screens and more particularly, though not exclusively, to screens intended for screening pulp in paper manufacture where the diluted stock is fed to a screen drum, usually the interior thereof, and there acted on by suitable devices, such, for example, as impelling blades, the finer particles being thereby passed through meshes of the screen while the coarser particles are discharged from the edge thereof.

The invention will be best understood by reference to the following description when taken in connection with the accompanying illustration of one specific embodiment thereof, while its scope will be more particularly pointed out in the appended claims.

In the drawings—

Fig. 1 is an elevation in central longitudinal section showing the principal working parts of a screen embodying one form of the invention;

Fig. 2 is an end elevation of the screen shown in Fig. 1;

Fig. 3 is a sectional elevation taken on the circumferential line 3—3 in Fig. 2; and Fig. 4 is a cross sectional elevation taken on the line 4—4 in Fig. 2.

Referring to the drawings and to the embodiment of the invention which is there disclosed for illustrative purposes, the screen comprises opposite end members or casings 11 having feet 13 on which the screen is supported. The end members have inturned circumferential flanges 15 to which is secured an outer casing 17 which is provided with detachable or sectional portions which may be removed for purposes of inspection or repair of the screen drum and other interior parts. Within the outer casing 17 there is provided the perforated or foraminous screen plate 19 in the form of a drum of any suitable and usual construction secured at its ends to the inwardly projecting flanges 21 on the end members. The space within the screen drum constitutes the screening chamber to which the diluted stock is fed. The annular space between the drum and the outer casing constitutes the screened stock chamber, the latter having the outlet 23 through which the finer screened stock is discharged after having passed through the screen and into the screened stock chamber.

The diluted stock is fed to the apparatus from any desired source of supply, and under a head sufficient to maintain a steady supply to the screening chamber, through the supply conduit 25 to the stock supply compartment 27 located on top of the outer casing 17, and is thence carried into opposite ends of the screening chamber through branched supply conduits 29 which turn downwardly at the outside of each opposite end casing 11.

The stock supply passages, the tailings discharge passages and the impelling devices on opposite sides of the central plane of the screen are of substantially similar construction and the parts on one side only need be described in detail.

Referring to Figs. 1 and 2, the stock at each end of the screen is supplied from the passages 29 to the exterior feed drum 31 and enters the fixed annular feed spout 33, whence it is discharged radially and symmetrically to the screening chamber through suitable supply orifices, herein comprising the annular slots 35 and 37 suitably located so as to distribute the stock supply lengthwise the interior of the screening chamber.

The stock which enters the screening chamber through the longitudinally distributed feed orifices is acted upon by impeller blades 39 which assist in advancing it progressively over the screen 19 and in carrying it forwardly and outwardly thereagainst under a continued pressure. The impelling devices, as well as the annular feed spout, are herein shown for the purpose of illustration as of the general construction described in our contemporaneously filed co-pending application Serial No. 19,609, filed March 31, 1925.

In the screening action the stock enters the screening chamber through the annular feed slots 35 and 37, the head under which the supply is maintained and the size of the feed passages and feed orifices being preferably such as to maintain the screening chamber substantially filled with the stock in a state of liquid suspension. The impeller blades 39, which are secured to the spider 41 mounted on the driving shaft 43, are rotated and carry the stock around and forward, forcing the finer particles through the screen, which latter pass down through the screened stock chamber and out through the outlet 23. The coarser particles or tailings gradually work toward the outer edges of the screen drum and are finally discharged into the tailings space 45 formed in the outer casing 17.

In the illustrated embodiment of the invention we have provided means whereby the escape of the tailings from the tailings space is checked or retarded so that, being at the same time thinned more or less with shower water, they tend to return to the screening chamber and thus subjected to repeated thinning and rescreening, the coarser particles finally rejected and escaping from the tailings space being thereby separated from substantially all the finer pulp or fibre capable of passing through the screen. In the present form of the invention this result is secured by providing a tailings outlet located at a point or level substantially above the bottom of the screening chamber, and herein above the longitudinal axis thereof, so that the tailings tend to accumulate and build up more or less of a back pressure or head, this not only facilitating their return to the screening chamber but assisting in maintaining the stock within the chamber in a state of liquid suspension. the rotary movement of the impeller blades and the head under which the stock is fed into the screening chamber being relied upon finally to force the coarser particles or slivers through the tailings outlet.

To this end the tailings space, during the normal operation of the screen, is closed at its bottom, escape for the tailings being provided through a slot or opening 47 (Figs. 2, 3 and 4) in the upper part of the casing, there being herein shown for that purpose two such openings in each end casing, one on each side thereof. Each opening is covered by a plate or cover 49 provided with a pipe connection 51 threaded into a raised boss on the plate, the pipe having suitable connection to a tailings discharge conduit, not herein shown.

If desired, the height of the tailings outlet may be made adjustable and for that purpose we have herein shown the slot or opening 47 arc shaped in form and adapted to be overlapped for a considerable distance by the plate 49, the latter made in the form of a segment. The edges of the plate 49 are fitted in grooves formed by the raised overlapping walls 53 of the casing, and to prevent leakage the walls of the casing at opposite ends of the slot 47 may also be provided with the packing strips 55 with which the overlapping ends of the plate engage.

The casing thus provides an arc shaped guideway in which the plate may be moved to different positions of adjustment within the range permitted by the length of the arc shaped slot 47, thus adjusting to different heights the outlet pipe 51 for the tailings space. The drawings show the tailings outlet 51 at its uppermost part but the range of adjustment may be made as great as desired in either direction, or the adjustable feature may be dispensed with entirely. When employed, however, it makes possible the variation in the height or set-back of the tailings to adapt the screen to different grades or classes of stock and to different conditions of operation.

The plate 49 is shown prolonged for a sufficient distance to provide the necessary overlap with relation to the slot in both extreme positions of adjustment. The prolonged portion of the plate enters a space between the casing and the supply chamber 29, as indicated in Figs. 2 and 3. The end casing 11 may be provided with one or more clamping screws 56 to hold the plate fast in selected position of adjustment.

As the coarser particles or rejects from the screening chamber rise to the level of the tailings outlet, they are subjected to a thinning action by means of a water shower. The latter may be located in any suitable location and, if desired, may extend entirely around the screen, but herein the shower water is delivered from a shower conduit 57 extending through the upper half of the circumferential tailings space in each end casing, such conduit being perforated at intervals to provide a shower throughout the entire upper half of the tailings space or the portion of the space above the level of the tailings. Due to the action of the shower and the concaved deflecting walls of the tailings space, the tailings which are delivered from the screening chamber to the upper part of the tailings space are not only thinned by the shower, but tend to gravitate back into the screening chamber, so that the combined effect of the shower and the agitation of the tailings through the movement of the impellers tends to subject the coarser rejects to a repeated rethinning and rescreening action. This results in the escape from the tailings space through the elevated tailings outlet of coarser particles or slivers with substatially all of the finer fibres eliminated therefrom and materially increases the effectiveness of the screen.

While we have herein shown for the purpose of illustration one specific embodiment of the invention and one specific form of screen, it is to be understood that useful application of the principle may be made to screens of widely different type and form and that extensive deviations may be made from the form, arrangement and mechanical construction of parts herein shown, all without departing from the spirit of the invention.

Claims:

1. In an apparatus of the class described, the combination with a casing containing a screened-stock chamber, of a screen drum having a screening chamber lengthwise which the stock is is adapted to travel, and movable impelling means within the screening chamber, said casing having a tailings space longitudinally separated from the point at which the stock is delivered to said drum and provided with an outlet above the bottom of the screening chamber to provide an accumulation of tailings.

2. In an apparatus of the class described, the combination with a casing containing a screened-stock chamber, of a horizontally arranged screen drum having a screening chamber, rotary impelling blades within the screen drum, a tailings space within the casing and beyond the end of the drum and said tailings space having its outlet at a substantial distance above the bottom of the drum to provide for an accumulation of tailings therein.

3. In an apparatus of the class described, the combination with a horizontally arranged screen drum, of a casing surrounding the same and provided with a screened-stock chamber, means for introducing diluted stock within the drum, movable impelling means within the drum, a tailings space within the casing at each opposite end of the drum, and an elevated outlet for each tailings space at a substantial distance above the bottom of the drum.

4. In an apparatus of the class described, the combination with a screen drum, of movable impelling means within the drum, a tailings space at the end of the drum communicating with the interior thereof, and an outlet for the tailings therefrom arranged at such a height with relation to the drum as to tend to return the tailings thereto.

5. In an apparatus of the class described, the combination with a casing containing a screened-stock chamber, of a horizontally arranged screen drum therein, rotary impelling means within said chamber, said casing having a tailings space at the end of the drum communicating with the interior of the drum and provided with an outlet located above the axis of the drum.

6. In an apparatus of the class described, the combination with a horizontally arranged screen drum, of a tailings space communicating with the interior thereof, a tailings outlet for said tailings space at a substantial distance above the bottom of the drum, and means in the upper part of said tailings space for showering the tailings therein.

7. An apparatus of the class described having a casing, a screen drum, a circumferential tailings space in the end of the casing communicating with the interior of the drum, a shower pipe in the upper part of said circumferential space, and a tailings outlet elevated above the bottom thereof to provide for an accumulation of tailings therein.

8. In an apparatus of the class described, the combination with a screen drum, of a casing, a tailings space, a vertical elongated slot in the casing communicating with the tailings space, and an adjustable plate overlying the slot and containing a tailings outlet communicating with the tailings space through said slot.

9. The method of screening fibre stock which consists in feeding the same to the interior of a horizontally arranged screen drum, acting on the fibres by an impelling action from within to force the finer fibres through the screen and the tailings through the end of the drum to a tailings space, and causing the tailings to accumulate in said space to a height substantially above the bottom of the drum.

10. The method of screening fibre stock which consists in feeding the same to the interior of a horizontally arranged screen drum, acting on the fibres by an impelling action from within to force the finer fibres through the screen and the tailings through the end of the drum to a tailings space, causing the tailings to accumulate in said space to a height substantially above the bottom of the drum, and diluting or thinning the tailings in the tailings space.

11. The method of screening stock which consists in feeding the same to the interior of a horizontally arranged screen drum, forcing the finer fibre through the drum and forcing tailings to return to the screen drum by repeatedly showering them and withdrawing them only at a point substantially elevated above the bottom of the drum.

12. In an apparatus of the class described, the combination with a screen drum having a screening chamber to which the unscreened stock is fed, of impelling means within the screening chamber, a tailings space communicating with the interior of the drum in which the tailings are adapted to accumulate and from which they may return in part to the interior of the drum, an outlet for the tailings from said tailings space, and means for regulating the escape of the tailings.

13. In an apparatus of the class described, the combination with a casing having a screening chamber provided with a screen and having movable impelling means adapted to traverse the stock lengthwise the screening chamber and force the finer fibres through the screen, said casing having a tailings chamber at the end of the screen and said chamber having an outlet above the bottom of the screening chamber to provide an accumulation of tailings.

14. In an apparatus of the class described, the combination with a screen drum, of a casing containing the drum, said casing having a stock inlet from which the stock is caused to traverse the drum, and a tailings space at the end of the drum in which the tailings are adapted to accumulate and from which they may return in part to the drum, said space having a tailings outlet adjustable as to height.

15. In an apparatus of the class described, the combination with a horizontally arranged screen drum, of a casing surrounding the same and provided with a screened stock chamber, means for introducing unscreened stock within the drum, rotary impelling devices within the drum, a tailings space within the casing at each opposite end of the drum, and a tailings outlet for each tailings space adjustable as to height.

In testimony whereof, we have signed our names to this specification.

HAROLD J. REED.
CLAUDE L. SPAFFORD.